United States Patent
Poornachandran et al.

(10) Patent No.: US 9,898,796 B2
(45) Date of Patent: Feb. 20, 2018

(54) COLLABORATIVE GRAPHICS RENDERING USING MOBILE DEVICES TO SUPPORT REMOTE DISPLAY

(71) Applicant: Intel Corporation, Santa Clara, CA (US)

(72) Inventors: Rajesh Poornachandran, Portland, OR (US); Michael Daniel Rosenzweig, Hopkinton, MA (US); Prakash N. Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/056,923

(22) Filed: Feb. 29, 2016

(65) Prior Publication Data
US 2016/0247251 A1  Aug. 25, 2016

Related U.S. Application Data

(63) Continuation of application No. 14/039,553, filed on Sep. 27, 2013, now Pat. No. 9,313,228, which is a
(Continued)

(51) Int. Cl.
*G06T 15/00* (2011.01)
*G06T 1/20* (2006.01)
(Continued)

(52) U.S. Cl.
CPC ............. *G06T 1/20* (2013.01); *G06Q 10/101* (2013.01); *H04L 63/20* (2013.01); *H04L 65/601* (2013.01);
(Continued)

(58) Field of Classification Search
CPC ................ H04L 63/20; H04N 21/4122; H04N 21/41407; G06Q 10/101
(Continued)

(56) References Cited

U.S. PATENT DOCUMENTS 6,809,734 B2  10/2004  Suzuoki et al.
7,885,635 B2 *  2/2011  Laursen ................. G06F 21/41
                                          455/403
(Continued)

FOREIGN PATENT DOCUMENTS

EP  1868078  12/2007
WO  2013028202  2/2013

OTHER PUBLICATIONS

Final Office Action for U.S. Appl. No. 14/039,553, dated Aug. 19, 2015.
(Continued)

*Primary Examiner* — Phu K Nguyen
(74) *Attorney, Agent, or Firm* — Green, Howard & Mughal LLP

(57) ABSTRACT

Systems, devices and methods are described including receiving a policy from a secure storage device, where the policy may be used to implement collaborative rendering of image content. The image content may include multiple portions of image content. The policy may be used to determining rendering assignments for multiple mobile devices where the assignments may specify that a mobile device is to render one content portion while another mobile device is to render another content portion. The rendering assignments may be provided to the mobile devices and rendered output corresponding to the different content portions may be received from the mobile devices. The rendered output may then be assembled into one or more image frames and wirelessly communicated to a remote display.

25 Claims, 9 Drawing Sheets

Related U.S. Application Data continuation of application No. 13/578,360, filed as application No. PCT/US2011/049191 on Aug. 25, 2011, now Pat. No. 8,570,318.

(51) Int. Cl.
*H04L 29/06* (2006.01)
*H04N 21/41* (2011.01)
*H04N 21/414* (2011.01)
*G06Q 10/10* (2012.01)
*H04L 29/08* (2006.01)

(52) U.S. Cl.
CPC ..... *H04L 67/1097* (2013.01); *H04N 21/4122* (2013.01); *H04N 21/41407* (2013.01)

(58) Field of Classification Search
USPC .................................................. 345/418, 419
See application file for complete search history.

(56) References Cited

U.S. PATENT DOCUMENTS

| | | |
|---|---|---|
| 8,028,020 B2 | 9/2011 | Huck et al. |
| 8,249,140 B2 | 8/2012 | Song et al. |
| 8,392,504 B1 | 3/2013 | Lang |
| 8,570,318 B2 | 10/2013 | Poornachandran et al. |
| 8,692,832 B2 | 4/2014 | Malakapalli et al. |
| 8,797,332 B2 | 8/2014 | Blinzer et al. |
| 8,819,705 B2 | 8/2014 | Reeves et al. |
| 8,924,885 B2 * | 12/2014 | LeVee .................. G06F 3/0481 715/781 |
| 8,957,905 B2 | 2/2015 | Reeves et al. |
| 9,047,102 B2 | 6/2015 | Liu |
| 2006/0267997 A1 | 11/2006 | Walls et al. |
| 2007/0185959 A1 | 8/2007 | Huck et al. |

OTHER PUBLICATIONS

International Preliminary Report on Patentability for International Patent Application No. PCT/US2011/049191, dated Mar. 6, 2014.
International Search Report and Written Opinion for International Patent Application No. PCT/US2011/049191, dated Mar. 9, 2012.
Non-Final Office Action for U.S. Appl. No. 14/039,553, dated Mar. 13, 2015.
Notice of Allowance for U.S. Appl. No. 13/578,360, dated Jul. 3, 2013.
Notice of Allowance for U.S. Appl. No. 14/039,553, dated Nov. 27, 2015.
Office Action for U.S. Appl. No. 13/578,360, dated Apr. 11, 2013.
Stoll, et al., "Lightning-2: A High Performance Display Subsystem for PC Clusters", ACM, SIGGRAPH, Aug. 12-17, 2001, pp. 141-148.

* cited by examiner

COLLABORATIVE GRAPHICS RENDERING USING MOBILE DEVICES TO SUPPORT REMOTE DISPLAY

This application is a continuation of U.S. application Ser. No. 14/039,553, filed on Sep. 27, 2013, which is a continuation of U.S. application Ser. No. 13/578,360, filed Aug. 10, 2012, and which was the National Stage of International Application No. PCT/US2011/049191, filed Aug. 25, 2011, all of which are incorporated herein in their entireties for all purposes.

BACKGROUND

Next generation mobile devices such as tablet computers, smart phones and the like may include remote display capability where content rendered from the mobile device may be displayed on a larger resolution/size display such as a liquid crystal display (LCD) television (TV), and so forth, over a wireless link. When providing remote display, the limited resources (battery, computational, graphics, etc) of mobile devices may require tradeoffs between image quality and play duration.

In many environments, such as group meetings, where high-resolution displays are frequently used, numerous idling mobile devices may be present. Ideally, the compute capability for each available wireless mobile device could be harnessed to drive a single remote display, yielding longer playback duration at better resolution and higher frame rates. What is needed are schemes that permit mobile devices to be dynamically arranged to provide remote display capabilities in a secure manner that requires as little user input as possible while remaining adaptive to changes in mobile device arrangements and/or status.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
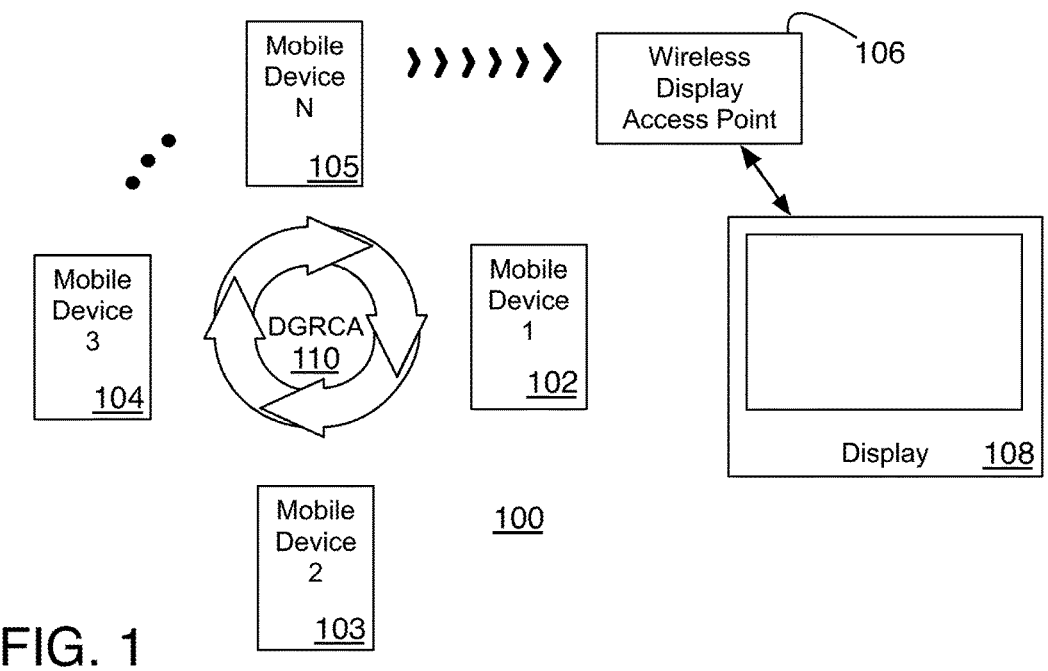
FIGS. 1, 2 and 3 are illustrative diagrams of example collaborative rendering systems.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

FIG. 1 illustrates an example system 100 in accordance with the present disclosure. In various implementations, system 100 may include multiple mobile devices 102 (mobile device 1), 103 (mobile device 2), 104 (mobile device 3) and 105 (mobile device N), a wireless display access point 106, and a display 108. Access point 106 may provide wireless communication of image content using any well-known wireless display scheme (see, e.g., WirelessHD® Specification version 1.1, published May 2010).

In accordance with the present disclosure, devices 102-105 in conjunction with access point 106 may implement a Distributed Graphics Rendering for Collaborative Applications (DGRCA) scheme 110 enabling devices 102-105 and access point 106 to provide distributed graphics rendering for remote display on display 108. Access point 106 may be coupled to display 108 using any wired or wireless technology. For example, devices 102-105 and access point 106 may communicate using any well-known wireless communication scheme such as WiFi® (see, e.g., Wi-Fi Peer-to-Peer (P2P) specification v1.1) or the like. Further, devices 102-105 and access point 106 may communicate wirelessly using control packets to implement DGRCA scheme 110.

In various implementations, DGRCA scheme 110 may permit access point 106 to coordinate the rendering of image content for display by controlling the distribution of rendering tasks amongst mobile devices 102-105. To do so, access point 106 may gather remote display capability information from mobile devices 102-105 to enable access point 106 to determine the rendering capacity of each device. The remote display capability information may include, for example, information indicating each device's excess power capacity, workload, etc. Using DGRCA scheme 110, access point 106 may distribute rendering tasks to devices 102-105 and then may collect the resulting rendered output from devices 102-105 and aggregate or compose that output to provide image content for display 108.

In accordance with the present disclosure, rendering may refer to any process or collection of processes that results in the generation of image content, such as one or more image frames, suitable for display. In various implementations, rendering may refer to various processing undertaken by 3D graphics, video, and/or multimedia applications that result in the generation of image frames suitable for display. For example, a video codec application or program executing on one of devices 102-105 may employ rendering processes to generate video content for display 108. Further, in various implementations, rendering may refer to any process or collection of processes undertaken by any application that results in image content suitable for display. For example, a presentation graphics application or program executing on one of devices 102-105 may employ rendering processes to generate image content (e.g., a slide show) suitable for presentation on display 108.

In various implementations, devices 102-105 may be any mobile devices or systems capable of collaborative graphics rendering such, for example, tablet computers, smart phones and the like. Display 108 may be any display capable of accepting image data from access point 106. For example, display 108 may be a large area, flat panel display such as an LCD TV, a plasma display panel (PDP) TV, a personal computer (PC) display, a projector display, and the like, configured to receive image content wirelessly from access point 106. In various implementations, display 108 may be coupled to a wireless display adaptor (not shown) that allows display 108 to receive image content wirelessly. While system 100 depicts four mobile devices 102-105, any number of mobile devices may enable DGRCA schemes in accordance with the present disclosure.

Figure 2:
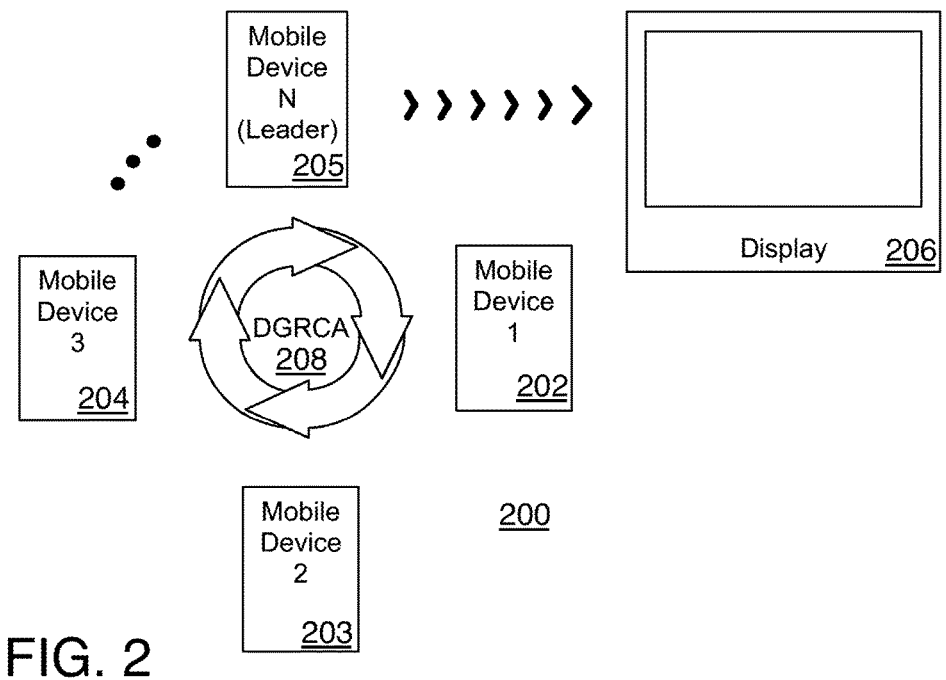

FIG. 2 illustrates an example system 200 in accordance with the present disclosure. In various implementations, system 200 may include multiple mobile devices 202 (mobile device 1), 203 (mobile device 2), 204 (mobile device 3) and 205 (mobile device N) and a display 206. In accordance with the present disclosure, devices 102-105 may implement a DGRCA scheme 208 enabling devices 202-205 and to provide distributed graphics rendering for remote display on display 206. DGRCA scheme 208 is similar to DGRCA scheme 110 except that system 200 does not include a wireless display access point and one of devices 202-205 (e.g., device 205) may act as a leader to coordinate remote rendering.

In various implementations, DGRCA scheme 208 may permit leader mobile device 205 to coordinate the rendering of images for display by controlling the distribution of rendering tasks amongst mobile devices 202-205. To do so, device 205 may gather remote display capability information from other devices 202-204 to enable leader device 205 to determine the rendering capacity of each device 202-204. Using DGRCA scheme 208 and knowledge about it's own remote display capabilities, leader device 205 may distribute rendering tasks to devices 202-104 and/or itself and then may collect the resulting rendered output and aggregate or compose that output to provide one or more frames of image data to display 206 using a wireless display scheme (e.g., WirelessHD®). While system 200 does not depict a wireless display access point, in some implementations, systems similar to system 200 may include a wireless display access point wirelessly linking a leader mobile device to a display device. Further, in various implementations, display 206 may be coupled to a wireless/wired display adaptor (not shown). In addition, remote displays in accordance with the present disclosure may be capable of aggregating or composing rendered output provided by a leader device or node.

In accordance with the present disclosure and as will be explained in greater detail below, a mobile device may include logic in the form of software, hardware and/or firmware, or any combination thereof, permitting that device to initiate and/or to be involved in a DGRCA scheme. In various implementations, devices collaborating in a DGRCA scheme may be described as rendering nodes or as simply nodes. In various implementations, one or more DGRCA algorithms executing on a leader device or node may dynamically and/or adaptively adjust rendering parameters of a DGRCA process to account for the loss or addition of collaborating mobile devices or nodes, changes in the remote display capabilities of collaborating nodes and so forth. In various implementations, leader nodes may be dynamically designated in response to changes in the remote display capabilities of collaborating nodes, etc. Further, as will also be explained in greater detail below, DGRCA schemes in accordance with the present disclosure may employ a hardware-based security engine to provide cryptographic functionality and a tamper resistant execution environment.

Figure 3:
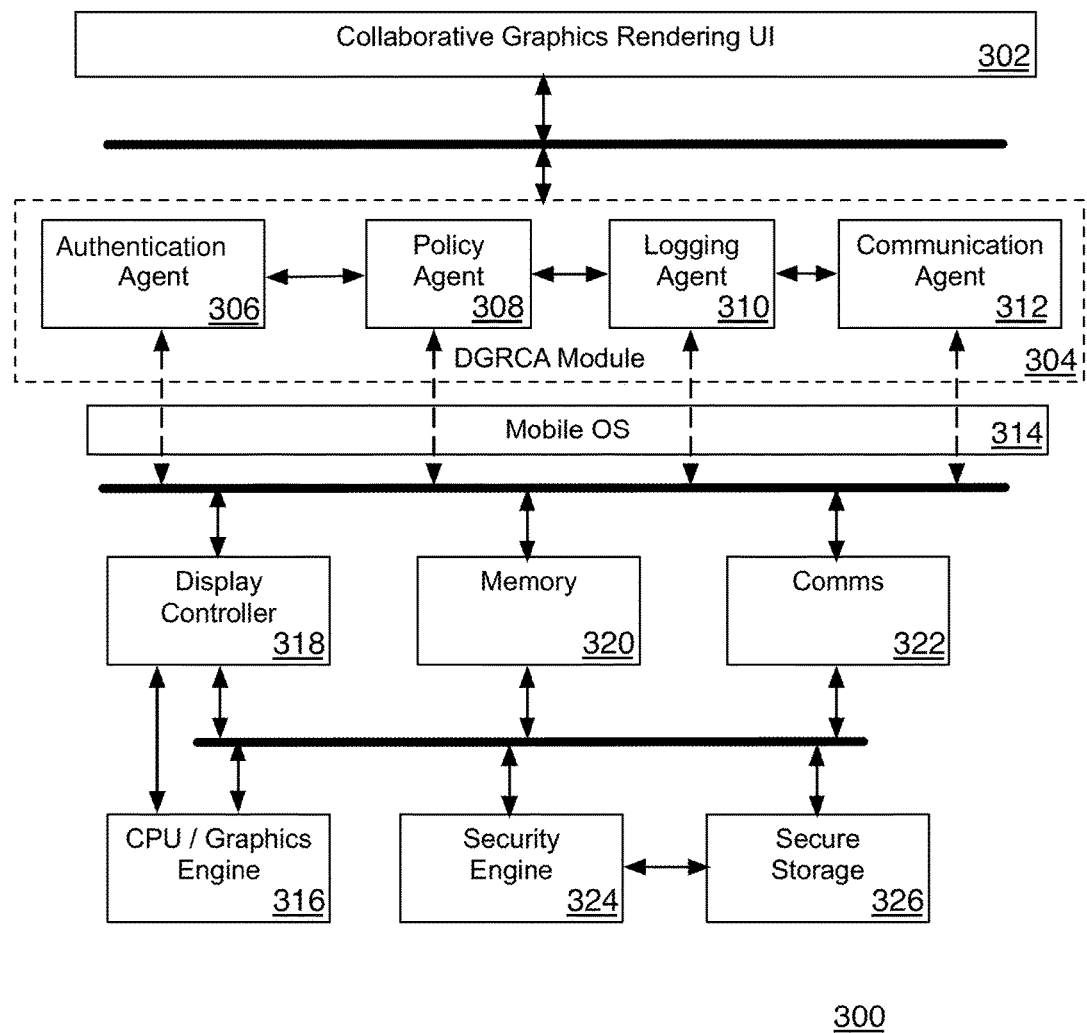

FIG. 3 illustrates an example DGRCA system 300 in accordance with the present disclosure. In various implementations, a mobile device capable of collaborative graphics rendering may include DGRCA system 300. For instance, any of mobile devices 102-105 of system 100 and/or mobile devices 202-205 of system 200 may include DGRCA system 300.

DGRCA system 300 includes a collaborative graphics rendering (CGR) user interface (UI) 302 communicatively and/or operably coupled to a DGRCA module 304. DGRCA module 304 includes an authentication agent 306, a policy agent 308, a logging agent 310 and a communication agent 312. CGR UI 302 and/or DGRCA module 304 may be implemented in the form of software, hardware and/or firmware logic, or any combination thereof. As will be explained in greater detail below, CGR UI 302 and DGRCA module 304 may implement various DGRCA schemes in accordance with the present disclosure.

System 300 also includes a mobile operating system (OS) 314 communicatively and/or operably coupled to DGRCA module 304. In various implementations, mobile OS 314 may communicatively and/or operably couple agents 306, 308, 310 and/or 312 of DGRCA module 304 to various additional components of system 300 including a CPU/Graphics engine 316, a display controller 318, memory 320, comms component 322, a security engine 324, and secure storage component 326.

In various implementations, components of DGRCA system 300 may be implemented in one or more integrated circuits (ICs) such as a system-on-a-chip (SoC) and/or additional ICs. Further, CPU/Graphics engine 316 may be any type of CPU architecture including one or more processor cores (not shown). In various implementations, display controller 318 may be any device capable of providing image data in a format suitable for display, such as, but not limited to, an Application Specific Integrated Circuit (ASIC), a Field Programmable Gate Array (FPGA), a digital signal processor (DSP), or the like. Memory 320 may be one or more discrete memory components such as a dynamic random access memory (DRAM) device, a static random access memory (SRAM) device, flash memory device, or other memory devices. Comms 322 may include communication logic capable of providing wireless communications via, for example, well-known Global Positioning System (GPS), WiFi®, WiMax®, and/or Bluetooth® capabilities and the like.

In various implementations, security engine 324 may be any type of hardware-based security engine that provides cryptographic functionality and a tamper resistant execution environment for system 300. For instance, security engine 324 may implement well-known Chaabi security schemes to provide authentication capabilities for DGRCA processes executing on system 300. In various implementations, security engine 324 may provide authentication for DGRCA policies that may be stored in secure storage 326. In various implementations, secure storage 326 may include one or more non-volatile memory devices such as embedded Multi-Media Card (eMMC) NAND-type flash memory devices.

In various implementations, authentication agent 306 may utilize security engine 324 to authentic other mobile devices and/or communications received from other mobile devices involved in DGRCA processes. In addition, policy agent 308 may manage DGRCA policies and/or may store DGRCA policies in or retrieve DGRCA policies from secure storage 326. Further, logging agent 310 may log all transactions occurring during DGRCA processing, while communications agent 312 may provide secure communications among collaborating devices using, for example, comms 326.

Figure 4:
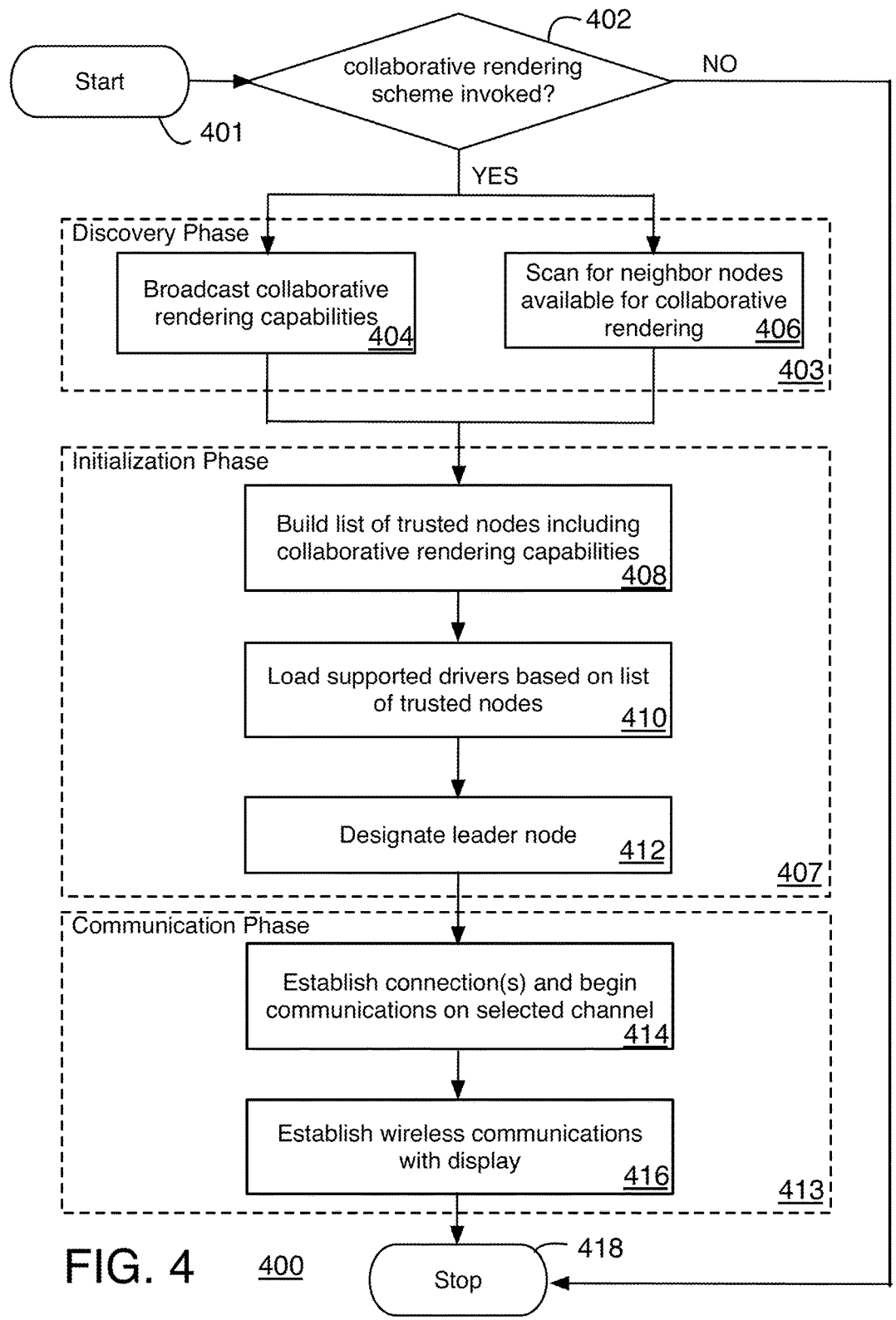
FIG. 4 illustrates an example collaborative rendering process.

FIG. 4 illustrates a flow diagram of an example initialization process 400 for initiating a collaborative rendering scheme according to various implementations of the present disclosure. Process 400 may include one or more operations, functions or actions as illustrated by one or more of blocks 401, 402, 403, 404, 406, 407, 408, 410, 412, 413, 414, 416 and 418 of FIG. 4. By way of non-limiting example, process 400 will be described herein with reference to example systems 100 and 200 of FIGS. 1 and 2 and example DGRCA system 300 of FIG. 3. Process 400 may begin at block 401.

At block 402, a determination of whether the initiation of a collaborative rendering scheme has been invoked may be made. For instance, a positive determination at block 402 may occur in response to a user of a particular mobile device that includes system 300 invoking UI 302 and/or DGRCA module 304. For instance, a user of a smart phone that includes system 300 may invoke the initiation of a DGRCA scheme by selecting an application icon or widget using the device's mobile OS 314. When doing so, the user may be presented with CGR UI 302 and may initiate DGRCA module 304 via UI 302. If a collaborative rendering scheme has not been invoked then process 400 may end at block 418, otherwise, if the result of block 402 is positive then a DGRCA discovery phase 403, a initialization phase 407, and a communications phase 413 may be undertaken.

Figure 5:
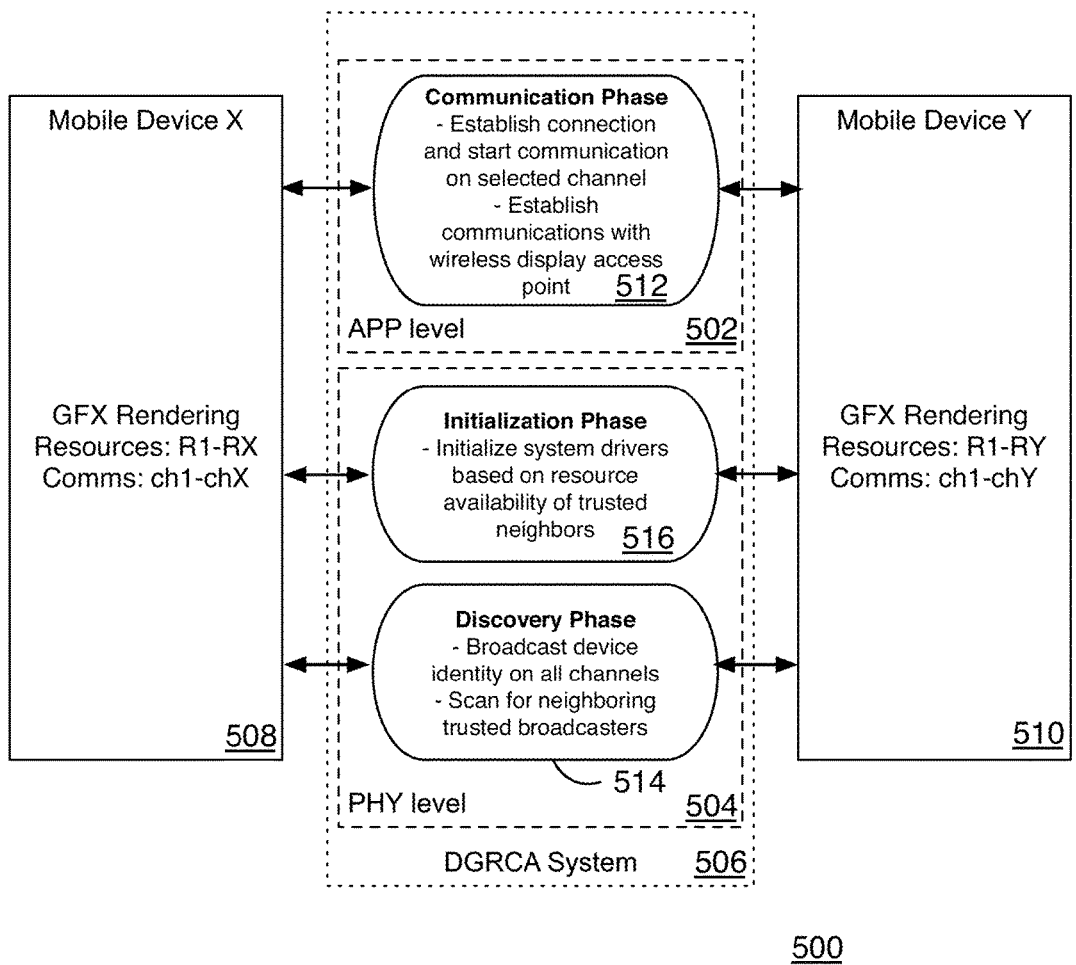
FIG. 5 is an illustrative diagram of a example collaborative rendering scheme.

FIG. 5 illustrates an example scheme 500 for DGRCA initialization processing according to various implementations of the present disclosure. In various implementations, phases 403, 407 and 413 of process 400 may be undertaken according to example scheme 500. DGRCA initialization processing according to scheme 500 may include processes taking place at both an APP level 502 and at PHY level 504 of a DGRCA system 506 that coordinates example collaborating mobile devices X (508) and Y (510). Processes taking place at APP level 502 may include a communications phase 512 corresponding to phase 413 of FIG. 4, while processes occurring at PHY level 504 may include a discovery phase 514 and an initialization phase 516 corresponding to phases 403 and 407 of FIG. 4, respectively. In various implementations, mobile devices 508 and 510 may represent a pair of mobile devices collaborating via DGRCA system 506 to render image data. For instance, mobile devices 508 and 510 may be any two of devices 102-105 of system 100.

Process 400 may continue with discovery phase 403 including broadcasting of collaborative graphics rendering capability at block 404 and scanning for neighboring nodes that are available for collaborative graphics rendering at block 406. For instance, block 404 may involve any DGRCA capable devices broadcasting their collaborative rendering capabilities. A device's collaborative rendering capabilities may include information corresponding to whether the device can act as a collaborative rendering leader node, what graphics rendering resources the device has available for collaborative rendering, what communications channels are available, the device's residual energy capacity, workload, etc. In various implementations, information corresponding to a device's residual energy capacity may include information about the charge state of the device's battery, the rate at which the device's battery charge is being depleted, and so forth. For example, a device's power manager routine or the like may provide residual energy capacity information at block 404. At the same time, block 406 may include DGRCA capable devices scanning the vicinity for other DGRCA capable devices that are likewise broadcasting their collaborative rendering capabilities.

Referring to scheme 500, blocks 404 and 406 may include discovery phase 514 where device 508 learns about the graphics rendering resources R1-RY and communications channels ch1-chY of device 510, while device 510 learns about the graphics rendering resources R1-RX and communications channels ch1-chX of device 508. Referring to DGRCA system 300, blocks 404 and 406 may involve DGRCA module 304 using communications agent 312 and comms 322 to broadcast collaborative rendering capabilities and to scan for collaborative rendering capabilities broadcasted by neighboring devices. In various implementations, a device that initiated the DGRCA scheme at block 402 may undertake blocks 404 and 406. For example, mobile device 205 of FIG. 2 may invoke DGRCA scheme 208 at block 402, may undertake block 404 by broadcasting its collaborative rendering capabilities to mobile devices 202-204, and may undertake block 406 by scanning for any broadcasts of collaborative rendering capabilities from mobile devices 202-204.

Process 400 may continue with initialization phase 407. At block 408, a list of trusted nodes may be built where the list includes the collaborative rendering capabilities of the neighboring devices that are determined to be trusted devices. In various implementations, block 408 may include using at least security engine 324 as well as authentication agent 306 and communication agent 312 of DGRCA module 304 to determine which neighboring devices detected at block 406 are trusted and available for inclusion in a DGRCA scheme. For example, mobile device 205 may undertake block 408 by determining that mobile devices 202-204 are trusted and by creating a list identifying mobile devices 202-204 as nodes available for DGRCA and providing corresponding collaborative rendering capabilities for those nodes. In various implementations, the list of trusted nodes generated at block 408 may be stored in memory such as memory 320 of system 300.

At block 410, corresponding drivers and/or software may be loaded based on the collaborative rendering capabilities of the trusted nodes, and, at block 412, a device may be designated as a leader node. Referring to scheme 500, blocks 408, 410 and 412 may include initialization phase 516 where, in a non-limiting example, system drivers for DGRCA system 506 may be initialized based on at least the resources R1-RX of device 508, the workload and battery state of device 508, the resources R1-RY of device 510, the workload and battery state of device 510, and/or the collaborative rendering capabilities of any other trusted neighbors.

In various implementations, block 412 may include a DGRCA system, such as system 506, designating one mobile device as a leader node to undertake the coordination of DGRCA rendering. For instance, referring to system 200 of FIG. 2, mobile device 205 may be designated as the leader node at block 412. The device designated as the leader node at block 412 may be the same device that initiated a DGRCA scheme at block 402. In other implementations, the device designated as the leader node at block 412 may be a different device that the one that initiated a DGRCA scheme at block 402. For instance, a wireless display access point (e.g., access point 106 of system 100) may be designated as a leader node. In various implementations, a leader node may be designated at block 412 as the device having greatest residual energy. In accordance with the present disclosure, and as will be explained in greater detail below, the leader node designated at block 412 may act to control and coordinate the collaborative rendering undertaken by the individual trusted nodes forming a DGRCA scheme.

Process 400 may continue with a communications phase 413 including the establishment of connections between the leader node and the other nodes and/or between pairs of nodes, and the beginning of communications on a selected channel (block 414). In various implementations, wireless communications between nodes in a DGRCA scheme may make use of small control packets to enhance bandwidth usage. For example, byte length control packets conforming to any wireless communications protocol such as WiFi®, Bluetooth® or the like may be employed in various implementations.

At block 416, wireless communications may be established between the leader node and a display. For instance, in system 200 of FIG. 2, blocks 414 may involve establishing communications amongst devices 202-205 using a communications channel selected by the leader node designated at block 412. Block 416 may then involve the leader device 205 establishing wireless communications with display 206 using well-known wireless display schemes. Device 205 may do so using, for example, a wireless display adaptor (not shown) coupled to display 206.

In other implementations, a wireless display access point may undertake blocks 414 and/or 416. For instance, in system 100 of FIG. 1, access point 106 may be designated a DGRCA leader node at block 412, and may undertake block 414 by establishing wireless communications between devices 102-105 using a communications channel it has selected. Block 416 may then involve access point 106 establishing wireless communications with display 108 using well-known wireless display schemes.

In various implementations, blocks 414 and/or 416 may include, at least in part, a communications agent 312 of the leader device designated at block 412 undertaking communications phase 512 to establish and initiate communications with trusted neighboring mobile devices. In doing so, the leader device's communications agent 312, authentication agent 306, comms 322 and/or security engine 324 may be involved in establishing connections and/or communications. In various implementations, the leader node designated at block 412 may establish encrypted communications at blocks 414 and 416. For instance, the leader node may designate that communications between trusted nodes and/or between the leader node and the display may use one of any number of well-known security encryption techniques. Following communications phase 413, initialization process 400 may end at block 418 resulting in the set-up or initialization of a collaborative rendering scheme such as a DGRCA scheme.

Figure 6:
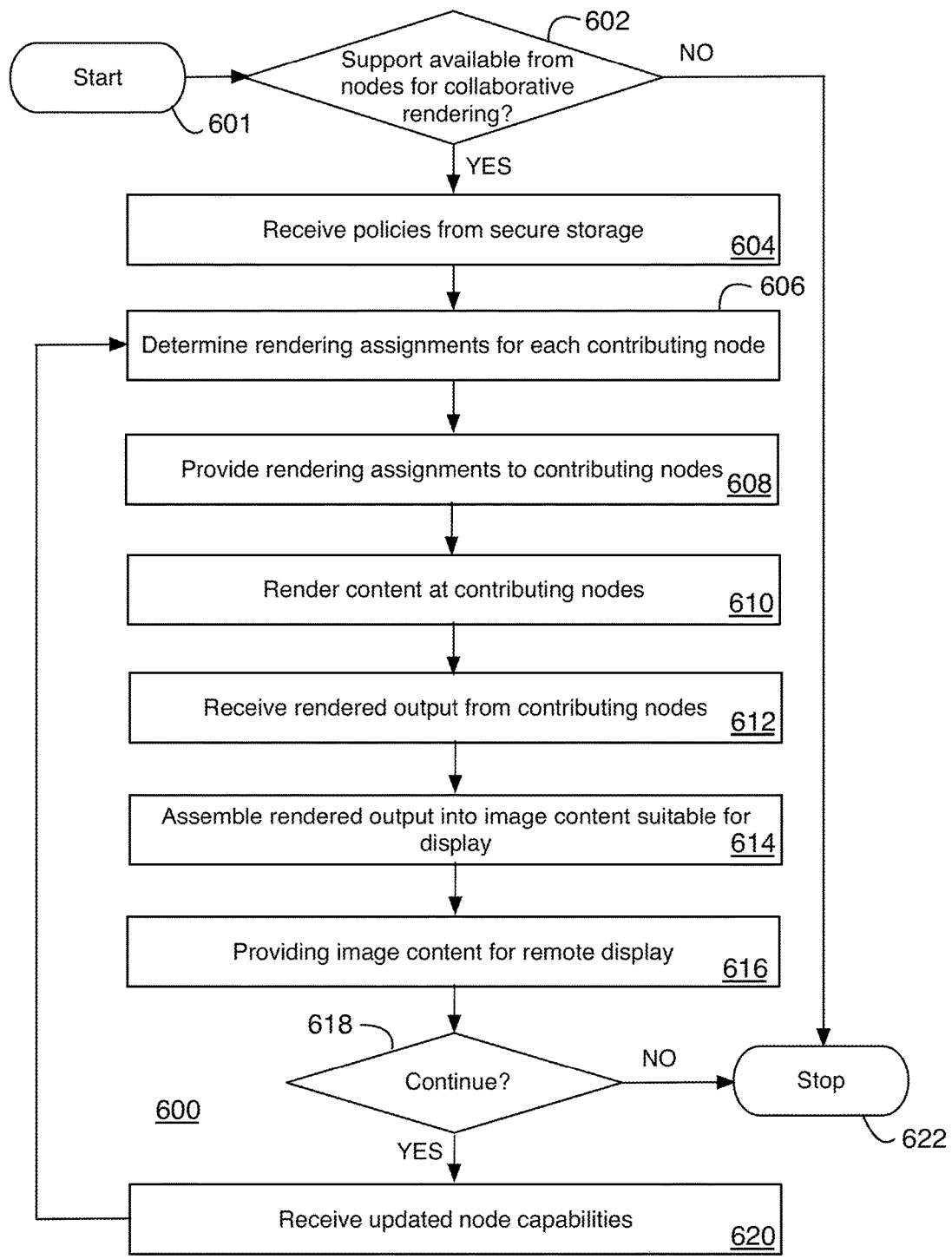
FIG. 6 illustrates an example collaborative rendering process.

FIG. 6 illustrates a flow diagram of an example collaborative rendering process 600 according to various implementations of the present disclosure. Process 600 may include one or more operations, functions or actions as illustrated by one or more of blocks 601, 602, 604, 606, 608, 610, 612, 614, 616, 618, 620 and 622 of FIG. 6. By way of non-limiting example, process 600 will be described herein with reference to example systems 100 and 200 of FIGS. 1 and 2 and example DGRCA system 300 of FIG. 3. Process 600 may begin at block 601.

At block 602 a determination may be made as to whether support for collaborative rendering is available from neighboring nodes (e.g., mobile devices). In various implementations, a user of a device that started process 400 and that was designated the leader node in initialization process 400 may undertake block 602 when the user invokes a collaborative rendering task using UI 302. For instance, a user of mobile device 205 (e.g., leader node in system 200) may wish to invoke DGRCA scheme 208 so that devices 202-205 may be employed as collaborating or contributing nodes to undertake a rendering task such as rendering image content for remote display.

For example, in order to undertake block 602, DGRCA module 304 may, at least in part, consult the list of trusted neighbors generated in initialization process 400 to determine if one or more trusted neighboring mobile devices are available and have sufficient collaborative rendering capabilities for the desired rendering task. For example, the rendering task may involve generating image content using a 3D graphics application such as a DirectFB application (see, e.g., DirectFB version 1.4.11, released Nov. 15, 2010), an OpenGL ES application (see, e.g., OpenGL Specification version 4.1, published Jul. 25, 2010), or the like. In another non-limiting example, the rendering task may involve using a video application conforming to an advanced video codec standards (see, e.g., ITU-T H.264 standard, published March 2003) to generating image content. Block 602 may then include determining whether each trusted node's collaborative rendering capabilities include support for the specific rendering application. Trusted nodes that are determined to be available to provide support for the rendering task at block 602 may be designated as contributing or collaborating nodes suitable for use in a DGRCA scheme.

If it is determined that support for collaborative rendering is not available, then process 600 may end at block 622. If, on the other hand, it is determined that support for collaborative rendering is available from one or more trusted nodes, then process 600 may continue at block 604 where a collaborative rendering process for remote display may be started using one or more policies received from secure storage. For example, DGRCA module 304 may undertake block 604 using security engine 324 to obtain one or more DGRCA policies from secure storage 326. In various implementations, a user of the leader node may specify the contents of the policies obtained at block 604. For example, UI 302 may permit a user to configure various DGRCA policy aspects including, but not limited to, which trusted nodes to collaborate with, how many trusted nodes to collaborate with, limitations of the usage of system components (e.g., CPU/GPU 316, Comms 322, etc.), battery usage limitations and so forth. In various implementations, the policies obtained at block 604 may prevent unauthorized users from exploiting DGRCA system resources.

At block 606, the rendered assignments for each contributing node designated at block 602 may be determined based, at least in part, on the collaborative rendering abilities of the nodes, and/or on the policies obtained at block 604. In various implementations, block 606 may involve the leader node (e.g., device 205 including system 300) determining, for each collaborating node, rendering parameters including, but not limited to, the resolution of the images to be remotely, the desired quality of rendering, the frame rate, available battery power in the contributing nodes, the view port size and tile settings for the collaborative rendering task, etc. For instance, leader node 205 may use DGRCA module 304 to determine what portions of the rendering task's image data each collaborating node is to render based, at least in part, on the node's collaborative rendering abilities. In addition, in various implementations, block 606 may involve the leader node determining whether collaborating nodes should compression encode their communications and/or rendering output before providing the communications and/or rendering output to the leader node, and, if so, what encoding parameters should be used by the collaborating nodes.

In accordance with the present disclosure, block 606 may involve a leader node spatially and/or temporally dividing a rendering task into multiple partial rendering tasks or assignments to be undertaken by the various collaborating nodes. For example, in various implementations, a leader node may apportion rendering tasks so that different spatial regions or tiles of one or more image frames are rendered by different nodes and/or so that different rendering tasks of one or more image frames are undertaken by the various collaborating nodes at different times. In various implementations, the rendering tasks may be chosen based on the computing or communication capabilities of the participating nodes. For example, in a bandwidth constrained environment, interframe rendering tasks may be specified rather than intraframe rendering tasks.

Figure 7:
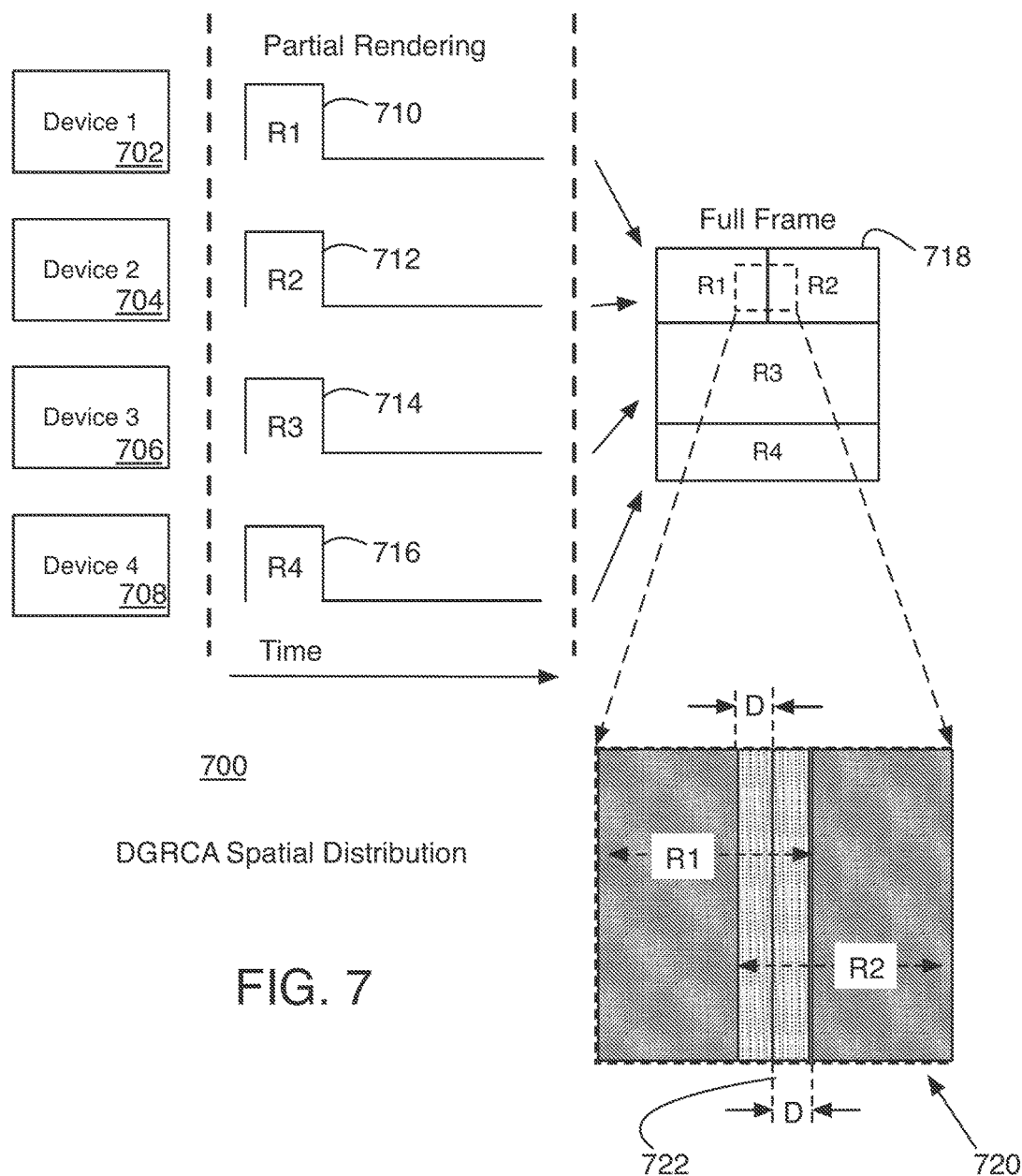
FIGS. 7 and 8 illustrate example collaborative rendering distributions.
Figure 8:
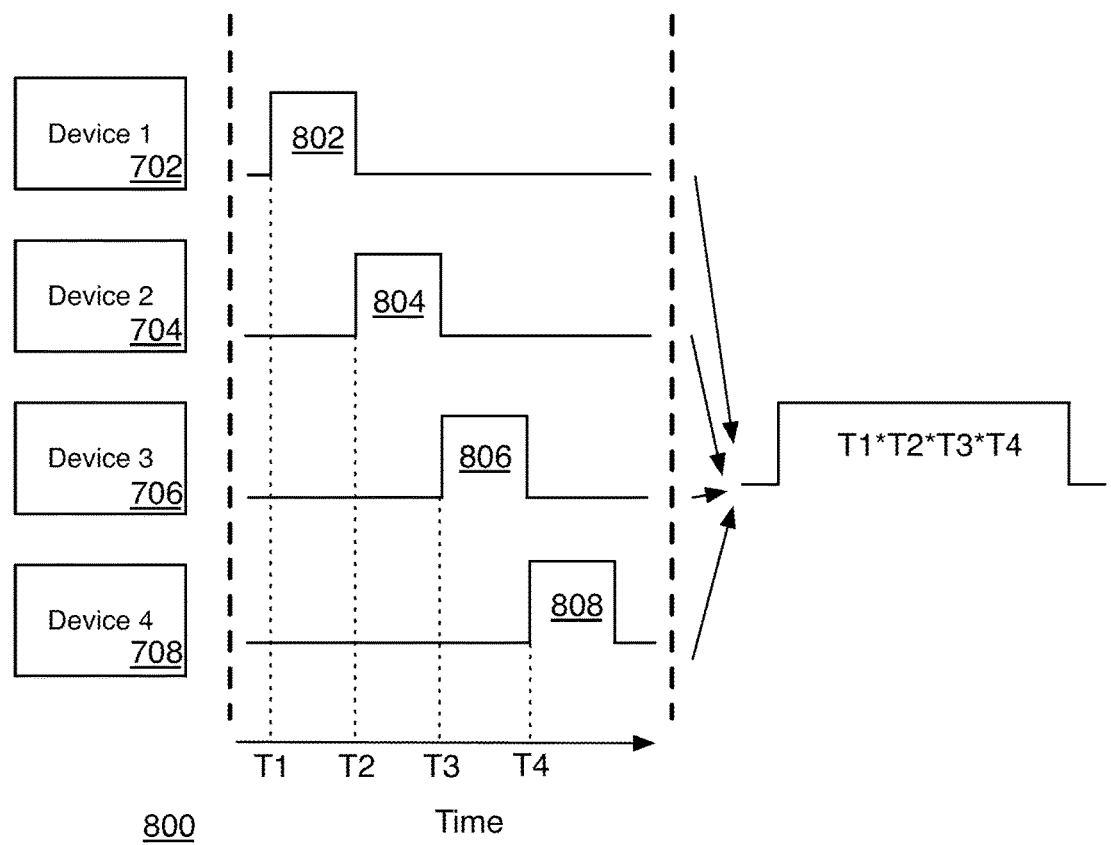

FIGS. 7 and 8 illustrate respective example collaborative rendering temporal workload distribution 800, and collaborative rendering spatial workload distribution 700 according to various implementations of the present disclosure. Distributions 700 and/or 800 illustrate instructive examples of how a leader node may organize collaborative rendering tasks when undertaking block 606 of process 600 for image content such as, for example, video content including one or more image frames. In example spatial workload distribution 700, four collaborating nodes 702-708 may undertake respective partial rendering tasks 710-716 as may be determined by a leader node at block 606 where each partial rendering task 710-716 corresponds to rendering a different content portion (e.g., tiles R1, R2, R3, or R4) of an image frame 718 as shown. In various implementations, block 606 may include a leader node specifying which node is to render which image portion or tile, and specifying the size and location of each portion or tile. For instance, the leader node may specify that device 702 is to render tile R1, device 704 is to render tile R2, device 706 is to render tile R3 and so on.

Further, in various implementations, the leader node may specify the collaborating nodes are to employ rendering overlap when rendering image tiles. For example, as shown in inset view 720, rendering of tiles R1, R2, R3 and R4 may be specified to overlap to some extent. In this example, both R1 and R2 include an overlap factor D extending beyond the boundary 722 between the tiles. For instance, each tile R1 and R2 may be specified at block 606 as having a size of, for example, 64×64 pixels, that are to be encoded by the nodes 702 and 704 as 72×72 so that the rendered output for R1 and R2 extends across boundary 722 on both sides by a value D of four pixels. The collaborating nodes may then remove excess pixel values before providing a rendered 64×64 tile output to the leader node. For instance, continuing the example from above, nodes 702 and 704 may render tiles R1 and R2 as 72×72 tiles and then may remove the pixels extending beyond the tile boundaries to provide 64×64 rendered output to the leader node. The value of the overlap factor D is not limited to any particular values and may, in various implementations, range in values from a pixel or less to a dozen or more pixels. Providing rendering overlap in this manner so that larger tiles are rendered than nominally needed to compose a frame may reduce edge artifacts at the boundaries between tiles.

In example temporal workload distribution 800, the four collaborating nodes 702-708 may undertake respective partial rendering tasks 802-808 for content portions as may be determined by a leader node (e.g., node 702) at block 606 where the partial rendering task 802-808 correspond to content portions that are distributed in time (e.g., T1, T2, T3, and T4). For example, each partial rendering task 802-808 of distribution 800 may correspond, without limitation, to nodes 702-708 undertaking the rendering of successive frames of video such that node 702 renders a first frame at time T1, node 704 renders a second frame at time T2, and so forth. In a further non-limiting example, tasks 802-808 may correspond to different inter/intra frame rendering tasks associated with image content processing using a video codec conforming to any one of a number of advanced video codec standards (e.g., H.264).

In various implementations, the content portions may represent different types of rendering tasks rather than different image frames or portions of image frames. For example, task 802 may correspond to foreground rendering of a 3D graphics scene, task 804 may correspond to background rendering of the scene, task 806 may correspond to post-processing such as image data format conversion, and task 808 may correspond to an assembly task where the leader node assembles the rendering output of tasks 802-806 for display. In such implementations, a collaborating node may provide rendered output to another collaborating node for further rendering. For instance, continuing the example from above, node 706 may provide post-processing format conversion (task 806) for foreground rendered (task 802) output received from node 702.

Returning to discussion of FIG. 6, after determining the rendered assignments for each collaborating node at block 606, the rendering assignments may be provided to the collaborating nodes at block 608. For instance, leader node 205 may use DGRCA module 304 to communications agent 312 and comms 322 to communicate the rendering assignments to mobile devices 202-204 in the form of small control packets using a well-known wireless communication scheme such as WiFi® or the like. As noted previously, communications between nodes in a DGRCA module may be encrypted using any well-known encryption schemes.

Process 600 may continue with the rendering of the content by the nodes at block 610. For example, referring to FIG. 7, devices 702-708 may undertake respective rendering tasks 710-716 at block 610 so that content for tiles R1, R2, R3 and R4 is rendered. In the example of FIG. 8, devices 702-708 may undertake respective rendering tasks 802-808 at block 610 so that, for example, content for four different frames is rendered at respective times T1, T2, T3 and T4. In various implementations, block 610 may involve the collaborating nodes employing the same graphics application to render the respective tiles. As noted above, the rendering undertaken may include overlap between adjacent tiles. Once rendered, the collaborating nodes may provide the rendered output to the leader node. In implementations that include overlapping rendered output, the collaborating nodes may remove the overlapping portion of the rendered output before providing the output to the leader node. Alternatively, the leader node may remove the overlapping portion of the rendered output.

At block 612, the leader node may receive the rendered output from each of the contributing nodes. In various implementations, the rendered output of each rendering task may be wirelessly communicated to the leader node by the corresponding contributing node using any well-known wireless communication scheme such as WiFi® or the like. The rendered output may be encrypted for communication using any well-known encryption schemes.

Process 600 may continue at block 614 where the rendered output may be assembled into image content suitable for display. For example, a DGRCA module 304 in a leader device of system 100 or 200 may coordinate the reception of the rendered content and may compose or assemble the rendered content into image frames. In various implementations, block 614 includes preparing the rendered content for remote display. Referring to the example of FIG. 7, block 614 may involve a leader node composing the rendered output for tiles R1, R2, R3 and R4. The leader node may also prepare the resulting frame 718 for remote display by, for example, modifying the resolution and/or aspect ratio of the image content and/or otherwise formatting the content for display on a device such as a television.

In another non-limiting example, referring to FIG. 8, block 614 may involve a leader node collecting the rendered output for a succession of frames at times T1, T2, T3 and T4 and then preparing the resulting frames as streaming video content for remote display. For instance, block 614 may involve a leader node collecting the rendered output for a succession of image frames and then synchronizing audio content to the image frames, etc. Further, block 614 may include a leader node discarding rendered content (e.g., image frame) received from a node if some aspect of the rendered content exceeds one or more quality thresholds. For example, rendered content may be discarded if the aspect ratio or resolution of the content exceeds a threshold value corresponding to a certain percentage of the remote display's aspect ratio or resolution.

At block 616 the image content may be provided for remote display. In various implementations, a leader node may undertake block 616 by wirelessly transmitting the image content to a display using any well-known wireless display technique such as WirelessHD® or the like. In various implementations, block 616 may include a leader node wirelessly transmitting one or more image frames to a display, or to a wireless display access point that may then wirelessly communicate the image frame(s) to the display. For example, in system 100, block 616 may include device 105 conveying one or more image frames to access point 106 and access point 106 conveying the frame(s) to display 108. In example system 200, block 616 may include 205 conveying one or more image frames directly to display 206.

At block 618 a determination may be made as to whether to continue the collaborative rendering. If the result of block 618 is negative then process 600 may end at block 622. On the other hand, if collaborative rendering is to continue with the processing of additional image content, process 600 may proceed to block 620 where updated node capabilities may be received.

In various implementations, block 620 may include a leader node receiving updated collaborative rendering capabilities from the contributing nodes. For instance, updated collaborative rendering capabilities received at block 620 may include information provided by, for example, a node's power manager, informing the leader node that a node's power levels have changed (e.g., the mobile device's battery has become depleted, etc.), that a node's workload has changed, etc. In addition, information received at block 620 may indicate that one or more nodes that had contributed to collaborative rendering in blocks 602-612 are no longer available for collaborative rendering. For example, a user of a collaborating node may turn their device off or may remove a collaborating node from the vicinity of the leader node. Further, information received at block 620 may indicate that one or more additional trusted nodes have become available for collaborative rendering. For example, a trusted node that is available of collaborative rendering but had not participated in blocks 602-612 may enter the vicinity of the leader node and may inform the leader node of its availability.

Process 600 may then loop back to block 606 where the leader node may again determine, for the additional image content, what content portions are to be rendered by each contributing node in response, at least in part, to the updated information received at block 620. In various implementations, reiteration of block 606 may involve the leader node adjusting the rendering parameters determined at the previous iteration of block 606 to account for changes in collaborating node capabilities and/or status as well as other parameters such as the previous frame's rendering quality, rendering quality expected for the next frame, and so forth. For example, referring to FIG. 7, a leader node may learn at block 620 that device 704 has insufficient power available for continued participation in collaborative rendering and, thus, may modify the rendering parameters at the next iteration of block 606 to specify that device 702 is to render content for both tiles R1 and R2. In another non-limiting example, referring to FIG. 8, a leader node may learn at block 620 that the workload of device 708 has increased and, thus, the leader may modify the rendering parameters when reiterating block 606 to specify that device 708 is to render content at time T3 (assuming that the rendering occurring at time T3 is less computationally intensive than that at time T4) while device 706 is to render content at time T4.

In various implementations, information received at block 620 may result in the designation of the leader node changing when block 606 is reiterated. For example, a DGRCA module in a leader node may determine, based on the information received at block 620 that another contributing node would better serve as the leader node in the next iterations of blocks 606-620. In such implementations, leadership of a DGRCA scheme may be passed from one trusted node to another trusted node. For instance, mobile device 205 may serve as the leader node for a first iteration of blocks 602-620, while, in response to the updated capabilities received at block 620, one of mobile devices 202-204 may be designated as the leader node for the subsequent iteration of blocks 606-620.

Figure 9:
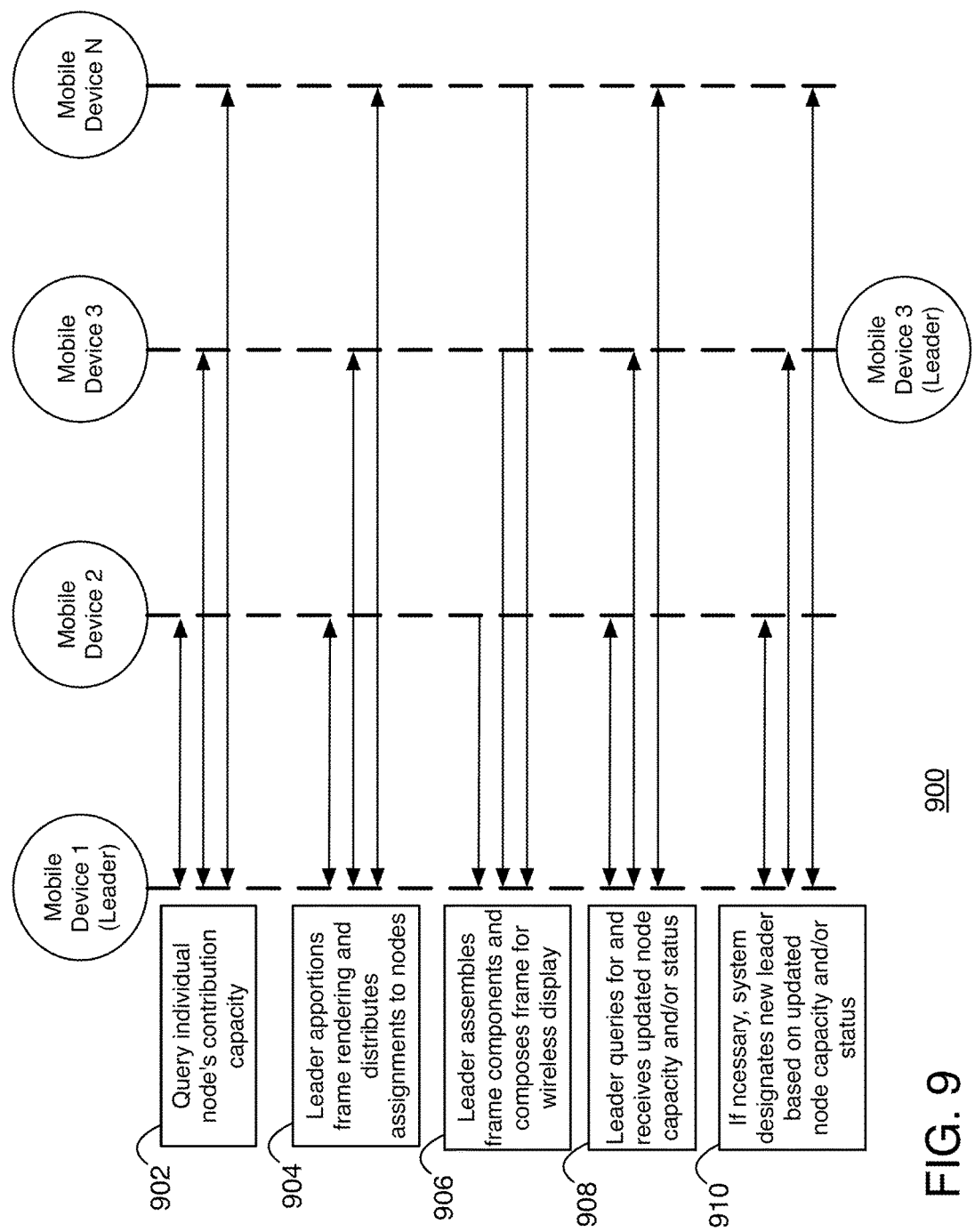
FIG. 9 illustrates an example collaborative rendering process.

FIG. 9 illustrates a flow diagram of an example collaborative rendering process 900 according to various implementations of the present disclosure. Process 900 may include one or more operations, functions or actions as illustrated by one or more of blocks 902, 904, 906, 908 and 910 of FIG. 9. By way of non-limiting example, process 900 will be described herein with reference to example DGRCA system 300 of FIG. 3 and example spatial distribution 700 of FIG. 7. Process 900 may begin at block 902.

At block 902 a collaborative rendering scheme's leader node may query each individual collaborating node for that node's capacity for contributing to a collaborative rendering task. In various implementations, block 902 may involve a leader node's DGRCA system 300 communicating a contribution capacity query to each collaborating node in a DGRCA scheme and then receiving a reply from each node specifying that node's collaborative rendering capacity available for the task.

In some implementations, a leader node in a DGRCA scheme may also act as a collaborating node and, hence, may undertake collaborative rendering tasks in accordance with the present disclosure as well as providing leader node functionality as described herein. In various implementations, a node may act as only a leader node for one collaborative rendering task (e.g., apportioning and assigning partial rendering tasks but not undertaking any of the tasks), and, for a subsequent collaborative rendering task, may act as only a collaborating node (e.g., another node is designated the leader node). In other implementations, a node may act as both a leader node and a collaborating node for one collaborative rendering task (e.g., apportioning/assigning partial rendering tasks and undertaking at least one of the tasks), and, for a subsequent collaborative rendering task, may act as only a collaborating node (e.g., another node is designated the leader node).

Process 900 may continue at block 904 with the leader node apportioning frame rendering into partial rendering tasks and then distributing the corresponding assignments to the collaborating nodes. For example, in distribution 700 where device 702 may have been designated as a leader node in process 400, block 904 may involve device 702's DGRCA system 300 apportioning the rendering of frame 718 into tasks 710, 712, 714 and 716 (e.g., corresponding to the rendering of tiles R1, R2, R3 and R4, respectively), assigning task 710 to itself, assigning tasks 712, 714, and 716 to respective devices 704, 706, and 708, and then communicating tasks 712, 714, and 716 to devices 704, 706, and 708, respectively. In various implementations, when communicating a rendering task to a collaborating node at block 904, a leader node may specify task information such as which portion of an image frame to render, etc.

At block 906, the leader node may receive the rendered output from the collaborative nodes and may compose the output into an image frame suitable for wireless display. For instance, device 702 may assemble frame components received from devices 704, 706 and 708 and corresponding to tiles R2, R3 and R4 and may compose those components, along with the output it generated for tile R1, to generate frame 718 as shown in FIG. 7.

At block 908, the leader node may query each individual collaborating node for that node's capacity for contributing to a next collaborative rendering task. In various implementations, block 908 may involve a leader node's DGRCA system 300 communicating a contribution capacity query to each collaborating node in a DGRCA scheme and then receiving a reply from each node specifying that node's collaborative rendering capacity and the node's status or availability for the next task. For example, device 702 may undertake block 908 for rendering a next image frame and the node capacities received in response to the new query may include changes in node capacity and/or availability.

At block 910, the system implementing process 900 may determine that a new leader node should be assigned based on changes in collaborating node capacity and/or availability received at block 908. In various implementations, a DGRCA system may determine that, in response to one or more collaborating node communicating changes in collaborative capacity and/or status at block 908, a new leader node should be designated at block 910. For instance, device 706 may indicate that it has increased collaborative rendering capacity at block 908 (e.g., device 706 now has a smaller workload) and, hence, at block 910. the DGRCA system may designate device 706 as the new leader node (displacing device 702).

While the implementation of example processes 400, 600 and 900, as illustrated in FIGS. 4, 6 and 9, may include the undertaking of all blocks shown in the order illustrated, the present disclosure is not limited in this regard and, in various examples, implementation of processes 400, 600 and/or 900 may include the undertaking only a subset of all blocks shown and/or in a different order than illustrated.

In addition, any one or more of the processes and/or blocks of FIGS. 4, 6 and 9 may be undertaken in response to instructions provided by one or more computer program products. Such program products may include signal bearing media providing instructions that, when executed by, for example, one or more processor cores, may provide the functionality described herein. The computer program products may be provided in any form of computer readable medium. Thus, for example, a processor including one or more processor core(s) may undertake one or more of the blocks shown in FIGS. 4, 6 and 9 in response to instructions conveyed to the processor by a computer readable medium.

Figure 10:
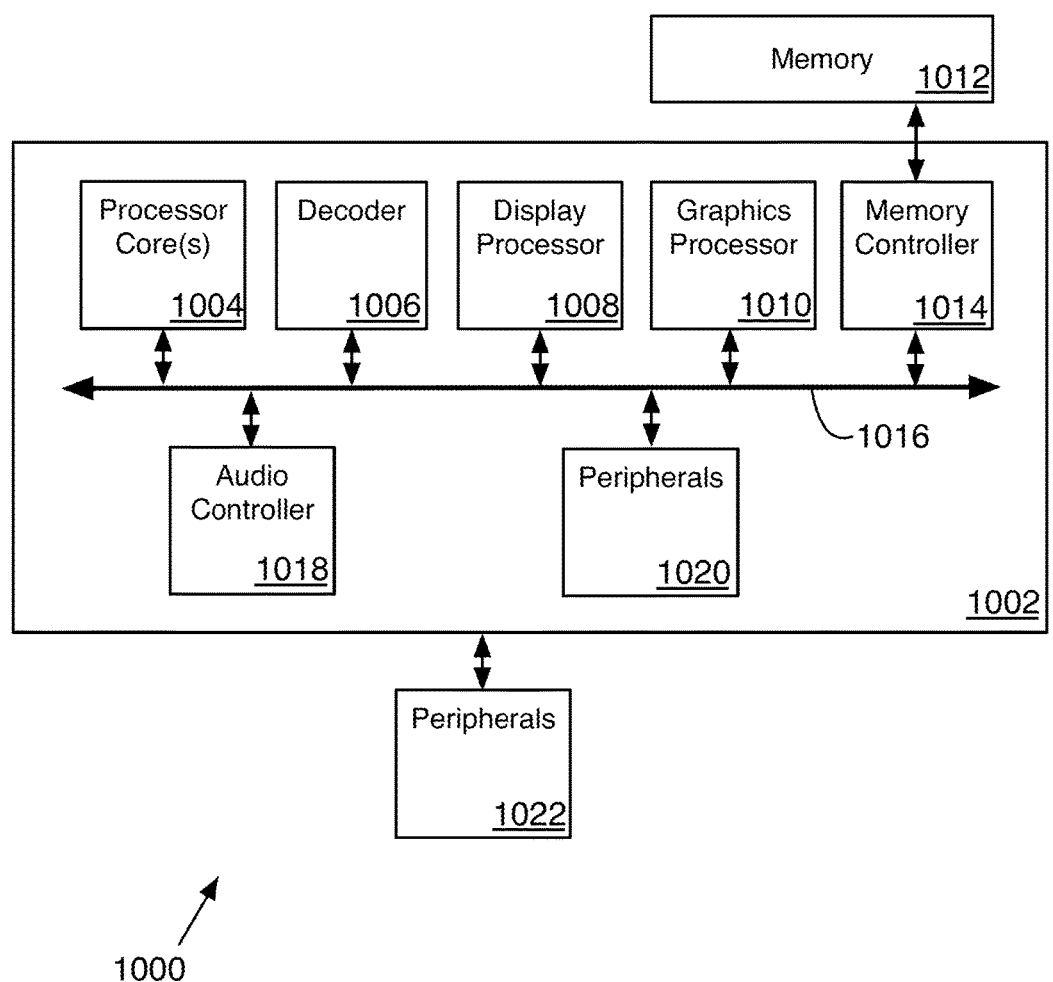
FIG. 10 is an illustrative diagram of an example system, all arranged in accordance with at least some implementations of the present disclosure.

FIG. 10 illustrates an example system 1000 in accordance with the present disclosure. System 1000 may be used to perform some or all of the various functions discussed herein and may include any device or collection of devices capable of undertaking collaborative rendering in accordance with various implementations of the present disclosure. For example, system 1000 may include selected components of a computing platform or device such as a desktop, mobile or tablet computer, a smart phone, a set top box, etc., although the present disclosure is not limited in this regard. In some implementations, system 1000 may be a computing platform or SoC based on Intel® architecture (IA) for CE devices. It will be readily appreciated by one of skill in the art that the implementations described herein can be used with alternative processing systems without departure from the scope of the present disclosure.

System 1000 includes a processor 1002 having one or more processor cores 1004. Processor cores 1004 may be any type of processor logic capable at least in part of executing software and/or processing data signals. In various examples, processor cores 1004 may include CISC processor cores, RISC microprocessor cores, VLIW microprocessor cores, and/or any number of processor cores implementing any combination of instruction sets, or any other processor devices, such as a digital signal processor or microcontroller.

Processor 1002 also includes a decoder 1006 that may be used for decoding instructions received by, e.g., a display processor 1008 and/or a graphics processor 1010, into control signals and/or microcode entry points. While illustrated in system 1000 as components distinct from core(s) 1004, those of skill in the art may recognize that one or more of core(s) 1004 may implement decoder 1006, display processor 1008 and/or graphics processor 1010. In some implementations, processor 1002 may be configured to undertake any of the processes described herein including the example processes described with respect to FIGS. 4, 6 and 9. Further, in response to control signals and/or microcode entry points, decoder 1006, display processor 1008 and/or graphics processor 1010 may perform corresponding operations.

Processing core(s) 1004, decoder 1006, display processor 1008 and/or graphics processor 1010 may be communicatively and/or operably coupled through a system interconnect 1016 with each other and/or with various other system devices, which may include but are not limited to, for example, a memory controller 1014, an audio controller 1018 and/or peripherals 1020. Peripherals 1020 may include, for example, a unified serial bus (USB) host port, a Peripheral Component Interconnect (PCI) Express port, a Serial Peripheral Interface (SPI) interface, an expansion bus, and/or other peripherals. While FIG. 10 illustrates memory controller 1014 as being coupled to decoder 1006 and the processors 1008 and 1010 by interconnect 1016, in various implementations, memory controller 1014 may be directly coupled to decoder 1006, display processor 1008 and/or graphics processor 1010.

In some implementations, system 1000 may communicate with various I/O devices not shown in FIG. 10 via an I/O bus (also not shown). Such I/O devices may include but are not limited to, for example, a universal asynchronous receiver/transmitter (UART) device, a USB device, an I/O expansion interface or other I/O devices. In various implementations, system 1000 may represent at least portions of a system for undertaking mobile, network and/or wireless communications.

System 1000 may further include memory 1012. Memory 1012 may be one or more discrete memory components such as a dynamic random access memory (DRAM) device, a static random access memory (SRAM) device, flash memory device, or other memory devices. While FIG. 10 illustrates memory 1012 as being external to processor 1002, in various implementations, memory 1012 may be internal to processor 1002. Memory 1012 may store instructions and/or data represented by data signals that may be executed by processor 1002 in undertaking any of the processes described herein including the example processes described with respect to FIGS. 4, 6 and 9. In some implementations, memory 1012 may include a system memory portion and a display memory portion.

The devices and/or systems described herein, such as example systems 100, 200, 300 and/or 1000 represent several of many possible device configurations, architectures or systems in accordance with the present disclosure. Numerous variations of systems such as variations of example systems 100, 200, 300 and/or 1000 are possible consistent with the present disclosure.

The systems described above, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed is:

1. A computer-implemented method for distributed remote rendering of an input image, the method comprising:
    sending data indicative of the input image for rendering;
    accessing first and second rendered content, wherein:
        the first rendered content corresponds to a first tile of the input image, and is rendered by a first remote rendering server based on first pixels within the first tile and second pixels within an overlap region of a second tile of the input image;
        the second rendered content corresponds to the second tile of the input image and is rendered by a second remote rendering server based on first pixels within the second tile and second pixels within an overlap region of the first tile; and
    assembling the first and second rendered content into an output image corresponding to the first and second tiles of the input image.

2. The method of claim 1, wherein sending data indicative the input image for rendering further comprises:
    sending data associated with the first tile to the first remote rendering server; and
    sending data associated with the second tile to the second remote rendering server.

3. The method of claim 2, wherein:
    sending data associated with the first tile further comprises sending a first N×M array of pixels;
    sending data associated with the second tile further comprises sending a second N×M array of pixels;
    accessing the first rendered content further comprises accessing a first K×L array of pixels;
    accessing the second rendered content further comprises accessing a second K×L array of pixels; and
    wherein K<N and L<M.

4. The method of claim 3, wherein the first and second N×M pixel arrays comprise at least 72×72 pixels and the first and second K×L pixel arrays comprise no more than 64×64 pixels.

5. The method of claim 1, further comprising separating the input image into the first and second tiles.

6. The method of claim 5, wherein separating the input image into the first and second tiles further comprises:
adding to the first tile a region along a boundary between the first and second tiles that includes pixels from the second tile; and
adding to the second tile a region along the boundary that includes pixels from the first tile.

7. The method of claim 6, wherein the region along the boundary further comprises a width along a vertical boundary between the first and second tiles.

8. The method of claim 1, wherein:
pixels within a first half of the overlap region are included in the first rendered content; and
pixels within a second half of the overlap region are included in the second rendered content.

9. The method of claim 1, wherein sending the input image for rendering further comprises:
sending data indicative of the first tile to the first remote rendering server over a wireless communication channel; and
sending data indicative of the second tile to the second remote rendering server over the wireless communication channel.

10. The method of claim 1, further comprising displaying the output image on a screen.

11. A non-transitory computer-readable media, with instructions stored thereon, which when executed by a processor, cause the processor to perform a method comprising:
sending data indicative of the input image for rendering;
accessing first and second rendered content, wherein:
the first rendered content corresponds to a first tile of the input image, and is rendered by a first remote rendering server based on first pixels within the first tile and second pixels within an overlap region of a second tile of the input image;
the second rendered content corresponds to the second tile of the input image and is rendered by a second remote rendering server based on first pixels within the second tile and second pixels within an overlap region of the first tile; and
assembling the first and second rendered content into an output image corresponding to the first and second tiles of the input image.

12. The media of claim 11, wherein the instructions for sending the input image for rendering further comprise instructions for:
sending data associated with the first tile to the first remote rendering server; and
sending data associated with the second tile to the second remote rendering server.

13. The media of claim 11, wherein:
the instructions for sending the first tile further comprise instructions for sending data indicative of a first N×M array of pixels;
the instructions for sending the second tile further comprise instructions for sending data indicative of a second N×M array of pixels;
the instructions for accessing the first rendered content further comprise instructions for accessing data indicative of a first K×L array of pixels;
the instructions for accessing the second rendered content further comprise instructions for accessing data indicative of a second K×L array of pixels; and
wherein K<N and L<M.

14. The media of claim 13, wherein the first and second N×M pixel arrays comprise at least 72×72 pixels and the first and second K×L pixel arrays comprise no more than 64×64 pixels.

15. The media of claim 11, wherein the instructions further comprise instructions for separating the input image into the first and second tiles.

16. The media of claim 15, wherein the instructions for separating the input image into the first and second tiles further comprise instructions for:
adding to the first tile a region along a boundary between the first and second tiles that includes pixels from the second tile; and
adding to the second tile a region along the boundary that includes pixels from the first tile.

17. The media of claim 16, wherein the region along the boundary further comprises a width along a vertical boundary between the first and second tiles.

18. The media of claim 11, wherein:
pixels within a first half of the overlap region are included in the first rendered content; and
pixels within a second half of the overlap region are included in the second rendered content.

19. The media of claim 11, wherein the instructions for sending the input image for rendering further comprise instructions for sending the first and second tiles to the first and second remote rendering servers over a wireless communication channel.

20. The media of claim 11, wherein the instructions further comprise instructions for displaying the output image on a display screen.

21. A system for distributed remote rendering of image data, comprising:
a processor; and
storage coupled to the processor, wherein the storage is to store instructions, which when executed by the processor, cause the processor to perform a method comprising:
sending data indicative of the input image for rendering;
accessing first and second rendered content, wherein:
the first rendered content corresponds to a first tile of the input image, and is rendered by a first remote rendering server based on first pixels within the first tile and second pixels within an overlap region of a second tile of the input image;
the second rendered content corresponds to the second tile of the input image and is rendered by a second remote rendering server based on first pixels within the second tile and second pixels within an overlap region of the first tile; and
assembling the first and second rendered content into an output image corresponding to the first and second tiles of the input image.

22. The system of claim 21, further comprising:
communication logic coupled to the processor, the communication logic to wirelessly communicate the first and second tiles to the first and second remote rendering servers over a wireless communication channel.

23. The system of claim 21, wherein the storage comprises a NAND-type flashy memory device.

24. The system of claim 21, wherein the processor has one or more CISC, RISC or VLIW processor cores.

25. The system of claim 21, further comprising a display processor coupled to the processor, the display processor to output the output image to a display screen.

* * * * *